US008068572B2

United States Patent
Langenbach et al.

(10) Patent No.: US 8,068,572 B2
(45) Date of Patent: Nov. 29, 2011

(54) SELF-TIMING METHOD FOR ADJUSTMENT OF A SAMPLING PHASE IN AN OVERSAMPLING RECEIVER AND CIRCUIT

(75) Inventors: Stefan Langenbach, Nuremberg (DE); Negojsa Stojanovic, Munich (DE)

(73) Assignee: Cisco Technology, Inc., San Jose, CA (US)

( * ) Notice: Subject to any disclaimer, the term of this patent is extended or adjusted under 35 U.S.C. 154(b) by 1274 days.

(21) Appl. No.: 10/547,169

(22) PCT Filed: Feb. 25, 2004

(86) PCT No.: PCT/EP2004/001838
§ 371 (c)(1),
(2), (4) Date: Feb. 14, 2007

(87) PCT Pub. No.: WO2004/077737
PCT Pub. Date: Sep. 10, 2004

(65) Prior Publication Data
US 2007/0291886 A1    Dec. 20, 2007

(30) Foreign Application Priority Data

Feb. 25, 2003  (EP) .................................... 03004079

(51) Int. Cl.
*H04L 7/00*    (2006.01)
*H04L 7/02*    (2006.01)
*H04L 7/04*    (2006.01)
*H03L 7/00*    (2006.01)

(52) U.S. Cl. ........ 375/355; 375/354; 375/359; 375/360; 375/362; 327/141; 327/160; 327/163

(58) Field of Classification Search .................. 375/326, 375/355, 371, 373, 374, 376; 327/156, 158, 327/160
See application file for complete search history.

(56) References Cited

U.S. PATENT DOCUMENTS

| | | | |
|---|---|---|---|
| 4,494,242 A | 1/1985 | Ehrenbard et al. | |
| 4,885,636 A | 12/1989 | Sullivan | |
| 4,959,845 A | 9/1990 | Tol et al. | |
| 5,048,060 A | 9/1991 | Arai et al. | |

(Continued)

FOREIGN PATENT DOCUMENTS

EP        0959597       11/1999

(Continued)

OTHER PUBLICATIONS

European Patent Office Commundation dated Apr. 22, 2009 re Appl. No. 04 714 323.5.

(Continued)

*Primary Examiner* — Chieh M Fan
*Assistant Examiner* — Eboni Hughes (57) ABSTRACT

This invention discloses a self-timing method for phase adjustment. An analog signal is digitized at a first and second phase with respect to the symbols comprised in an analog signal in order to obtain first and second quantized samples. Then a first counter out of a first plurality of counters is increased if said first quantized sample has a first digital value to which said first counter is associated. Moreover a second counter out of a second plurality of counters is increased if a second quantized sample has a second digital value to which the second counter is associated. Finally the sampling phase is adjusted based on the values of the counters of the first and second plurality of counters. Moreover a digitizing, self-timing circuit is disclosed.

20 Claims, 4 Drawing Sheets

U.S. PATENT DOCUMENTS

| | | | |
|---|---|---|---|
| 5,245,637 A * | 9/1993 | Gersbach et al. | 375/374 |
| 5,291,523 A | 3/1994 | Bergmans et al. | |
| 5,295,155 A * | 3/1994 | Gersbach et al. | 375/214 |
| 5,533,066 A | 7/1996 | Yamaguchi et al. | |
| 6,052,423 A | 4/2000 | Fine et al. | |
| 6,239,635 B1 * | 5/2001 | Matsuzaki | 327/160 |
| 6,266,799 B1 * | 7/2001 | Lee et al. | 716/113 |
| 6,462,726 B1 * | 10/2002 | Hamada et al. | 345/98 |
| 6,760,389 B1 * | 7/2004 | Mukherjee et al. | 375/326 |
| 2002/0009167 A1 * | 1/2002 | Farjad-Rad | 375/355 |

FOREIGN PATENT DOCUMENTS

| | | |
|---|---|---|
| EP | 1 009 125 A2 | 6/2000 |
| EP | 1 223 704 A2 | 7/2002 |
| WO | WO8810544 | 12/1988 |
| WO | WO 02/19655 A2 | 3/2002 |
| WO | WO 02/30035 A1 | 4/2002 |
| WO | WO 02/076010 A2 | 9/2002 |

OTHER PUBLICATIONS

International Search Report, Jun. 9, 2004.

European Search Report, Mar. 21, 2000.

Teiji Ohta, On the Quantization Error of Max Quantizer, Signal Image and Video Processing, Singapore, Jun. 11-14, 1991, Proceedings of the International Symposium on circutis and Systems, New York, IEEE, US-ISBN 0-7803-0050-5, vol. 1, SYMP. 24, pp. 340-343.

* cited by examiner

SELF-TIMING METHOD FOR ADJUSTMENT OF A SAMPLING PHASE IN AN OVERSAMPLING RECEIVER AND CIRCUIT

This invention pertains to a self-timing method for phase adjustment of a sampling phase according to the preamble part of claim 1 and a digitizing, self-timing circuit according to the preamble part of claim 7. More specifically this invention relates to a method and a circuit for adjusting the phase of a symbol clock recovered from an analog signal that does not provide a carrier in order to minimize the bit error rate after symbol detection.

A method of the preamble part of claim 1 and a circuit of the preamble part of claim 7 are described in WO 02/30035 A1 titled "Symbol Timing Recovery Method for Low Resolution Multiple Amplitude Signals".

Modern receivers are used to demodulate, detect and decode digitally transmitted signals e. g. in mobile or fiber optical communications. Due to varying power level of the input signal, an Automatic Gain Control (AGC) circuit is normally included before an Analog-to-Digital Converter (ADC) in order to adapt the signal amplitude to the conversion range. A digital equalizer (EQ) and an error correcting circuit (ECC) usually follow the ADC in order to arrive at an acceptable bit error rate (BER). A clock recovery (CR) circuit extracts frequency and phase and generates a local sampling clock at approximately equidistant points in time, with some more or less fixed phase relation to the transmitted symbol stream. A Sampling Phase Adjustment (SPA) circuit may or may not be present. Its purpose is to add a phase delay to the recovered sampling clock, in order to optimize receiver performance. In simple receivers for low-distortion channels, the SPA is usually missing.

Various clock recovery schemes are discussed in "Integrated Fiber-Optic Receivers" by A. Buchwald, K. W. Martin, Kluwer Academic Publishers, 1995 (later referred to as "Buchwald95"). The U.S. Pat. No. 5,048,060 titled "Digital Signal Receiving Circuit with Means for Controlling a Baud Rate Sampling Phase by a Power of Sampled Signals" describes a clock recovery method according to which an analog input signal is sampled to produce a series of sampled signals and adjusts the sampling phase based on the series of sampled signals. To this end the sampled signals are equalized and digitally filtered.

In practical digital communication systems for high-speed transmission and In mobile communications through a band-limited channel, the frequency response of the channel is not known with sufficient precision. Moreover, many channels have a priori unknown and/or time-variant frequency-response characteristics, like, e.g., wireless channels or optical channels. For such channels, it is not possible to design optimum fixed demodulation filters; they require adaptive equalization, instead.

Under the crucial assumption that the received signals are sampled at proper sampling frequency and phase, many techniques are known that are capable of accurately restoring the received signals into original digital signals. Therefore, one of the most important processes in a digital receiver is to accurately restore symbol timing in terms of frequency and phase, i.e. to determine the points in time when the received signal should be sampled. In some older systems, a specific carrier corresponding to a sampling frequency was transmitted, providing frequency and phase for sampling. However, most modern systems do not provide a carrier; it is therefore important to accurately recover a symbol timing designated also clock recovery (CR) using only the received signal designated self-timing. Without explicit frequency and phase information being available in the receiver, receiver complexity is increased e.g. due to clock recovery circuits or due to the need for error resilient facilities, like error correction circuits.

Generally, digital methods for sampling phase adjustment can be divided into two groups: symbol-rate sampling methods and oversampling methods utilizing a clock, which is faster than symbol rate.

In Symbol-rate Sampling methods, data is sampled at symbol rate in order to determine sampling phase based on optimization of some control parameter.

In U.S. Pat. No. 4,494,242 titled "Timing Recovery in a Baud-Rate Sampled-Data System", timing recovery is based on the recognition that the precursor portion of the response of the channel is relatively invariant and predictable. By selecting a specified threshold point in a small-amplitude region of the precursor portion, a basis is provided for generating accurate bipolar error signals that insure consistent baud-rate sampling of received pulses. A similar approach is disclosed in U.S. Pat. No. 4,959,845 titled "Receiver of a System for Transmitting Data Symbols at a Given Baud-Rate".

However, the assumption of an invariant and a predictable pulse shape fails in many time-variant channels. In U.S. Pat. No. 5,048,060 titled "Digital Signal Receiving Circuit with Means for Controlling a Baud Rate Sampling Phase by a Power of Sampled Signals", inventors calculate an element of the autocorrelation function of a series of baud rate sampled signals and use its value to find the correct sampling phase. Actually, they choose the sampling phase that either maximizes or minimizes this element of the autocorrelation function. This approach is not applicable in severely distorted channels such as, e.g., optical channels with substantial chromatic dispersion and polarization mode dispersion. For example, it can be shown by simulation results that for special channel conditions the autocorrelation function values R(0) and R(T), where T is a bit period, vary very little with sampling phase. Consequently finding extrema is actually Impractical. For other channel conditions, the relevant extremum may even occur at a sampling phase with non-minimal BER. Also, if an (AGC) circuit uses outputs of an ADC for amplification adjustment, the AGC circuit will tend to keep signal power at a constant value and the power measurement cannot be used for timing recovery.

An interesting method is described in WO 00/19655 titled "Timing Recovery for a High Speed Digital Data Communication System based on Adaptive Equalizer Impulse Response Characteristics". The timing recovery technique is based upon an analysis of the impulse response of the equalizer structure having a feed forward equalizer and a decision feedback equalizer. The filter tap coefficients are analyzed and the sampling phase is adjusted such that a cost function associated with the performance of the equalizer structure is substantially optimized. Unfortunately, for very distorted channels, feed forward equalizers and decision feedback equalizers fail due to their high BER. Rather Viterbi equalizers should be used. Generally, the methods based on symbol rate sampling take a long time for synchronization.

Oversampling methods perform sampling of the received signal at a sampling frequency higher than symbol frequency.

U.S. Pat. No. 5,291,523 titled "Viterbi Receiver with Improved Timing Means" teaches to use two Viterbi detectors and sample the received signal twice in each symbol period.

In accordance with the disclosure of EP 1 009 125 A2 titled "Viterbi Receiver With Improved Timing Means", synchronization with the received high-speed serial digital signal can be established at high-speed, and synchronization can be adjusted towards the zero transition point of the received signal. FIG. 3 of EP 1 009 125 A2 illustrates four-fold oversampling.

A received symbol stream is M-fold and 12-fold oversampled and correlated with a known synchronization word in U.S. Pat. No. 5,533,066 ("Apparatus and Method for Estimating Maximum Likelihood Sequence Using Optimum Sampling Phase") and WO 02/076010 A2 ("Symbol Recovery From an Oversampled Hard-Decision Binary Stream"), respectively. However, usage of a synchronization word is undesirable in many applications. Moreover, the main weakness of techniques using massive oversampling is the required high processing speed. N-fold oversampling necessitates processing at a frequency N times higher than symbol frequency. This is not feasible in high-speed systems such as 10 GHz or 40 GHz optical systems.

In WO 02/30035 A1 the inventors describe symbol timing in a system which does not provide a carrier corresponding to a symbol frequency. By collecting a histogram of samples for a predetermined number of symbol times symbol edges and a maximum eye opening are determined. Specifically an average, weighted average, or other method is applied to determine an average timing for maximum eye opening for each symbol time. Eight-fold over-sampling is employed.

A similar disclosure is comprised in U.S. Pat. Nos. 5,245,637 and 5,295,155.

It is the object of this invention to provide an improved method and an improved sampling phase adjustment circuit.

This object is achieved by the subject matter of the independent claims.

Preferred embodiments of the invention are the subject matter of the dependent claims.

The advantage of choosing a sampling phase so that a population difference parameter is maximized is that this leads to a, at least nearly, optimum, i.e. to a minimized bit error rate. Following the de-facto conventions in the literature, the terms "optimal" or "optimized" are used in a somewhat loose sense. What is meant is that a solution of minimized BER Is sought within some practical framework or solution space, not excluding the case that in a slightly modified framework even lower BER might be achieved.

Provided that the first and second digital values may assume N different digital values, a number of N counters in each of the first and second plurality of counters provides the most accurate approximation of the population difference parameter defined in equation (1).

A simple and robust algorithm for maximizing the population difference parameter and thereby optimizing the sampling phase in order to arrive at a minimum BER is provided. To this end the sampling phase is increased, if the population difference parameter increases with the sampling phase and decreased otherwise. More specifically, the sampling phase is increased if a second population difference parameter following a first population difference parameter is bigger than the first population difference parameter and the sampling phase has been increased between the first and second population difference parameter. The sampling phase is also increased if the second population difference parameter is smaller than the first population difference parameter and the sampling phase has been decreased between the first and second population difference parameter.

Using dedicated circuits like counters, absolute difference circuits, de-multiplexer and first and second distribution circuits provide for a high operation speed.

Since the counters count M quantized samples the necessary operation speed after the counters drops approximately by a factor M wherein M may be chosen to be two thousand. As a consequence general purpose logic circuits like a microprocessor or CPU may be used rather than dedicated logic in order to save development and production costs for low volume batches.

In order to avoid a delay when a microprocessor or CPU sequentially reads out the counter values holding circuits may be provided between the counters and the microprocessors for temporarily storing the counter values after M samples have been processed. So the holding circuits constitute an interface which insures that all quantized samples are taken into consideration for the calculation of the population difference parameter i.e. no quantized samples are ignored during an idle period after M quantized samples have been processed.

This invention can be more fully understood from the following detailed description when taken in conjunction with the accompanying drawings, in which.

ABBREVIATIONS

| ADC: | Analog-to-digital converter |
|---|---|
| AGC: | Automatic gain control |
| BER: | Bit error rate |
| CPU: | Central processing unit |
| CR: | clock recovery |
| ECC: | Error correcting code, error correction circuit |
| EQ: | digital equalizer |
| FSE: | Fractionally spaced equalizer |
| ISI: | Intersymbol interference |
| PS: | phase shift |
| SPA: | sampling phase adjustment |
| XOR: | exclusive-OR |

Mathematical Symbols

| $b(t)$: | timing signal |
|---|---|
| $c_{\phi_k}(i)$: | counter state of counter i for phase $\phi_k$ after M symbols |
| $c(t)$: | control signal |
| clk: | clock |
| n: | resolution in bits of the quantizer |
| N: | number of counters in each group, number of quantization levels |
| M: | number of symbols counted |
| pdf: | probability density function |
| pd: | population difference parameter |
| pdm: | modified population difference parameter |
| $pd_q$: | quantized population difference parameter |
| $pdm_q$: | quantized modified population difference parameter |
| T: | symbol period |

-continued

Δ: sampling phase adjustment step
φ: phase
φ$_1$, φ$_2$: sampling phases

While the present invention is described with reference to the embodiments as illustrated in the following detailed description as well as in the drawings, it should be understood that the following detailed description as well as the drawings are not intended to limit the present invention to the particular illustrative embodiments disclosed, but rather the described illustrative embodiments merely exemplify the various aspects of the present invention, the scope of which is defined by the appended claims.

Sampling Phase Adjustment Method

The sampling phase adjustment (SPA) method exploits sample statistics in order to adjust the sampling instants to their correct value. The sample statistics are obtained from the waveform of a plurality of symbols or pulses at different sampling instants. The SPA method is performed within a receiver of digitally transmitted signals. The relevant parts of the receiver are presented in FIG. 2. The received electrical signal is designated s(t). It may be the output signal of a preamplified antenna signal in the case of mobile communications or the output of a optical-to-electrical interface of an optical receiver. Due to varying power level of the received signal s(t), an Automatic Gain Control (AGC) circuit 1 is included before the Analog-to-Digital Converter (ADC) 4 in order to generate a gain controlled signal gs(t). The AGC circuit 1 ensures a proper analog-to-digital conversion of the analog signals. ADC 4 outputs quantized samples qs. A digital equalizer (EQ) 5 and an error correcting circuit (ECC) 6 usually follow the ADC.

Figure 2:
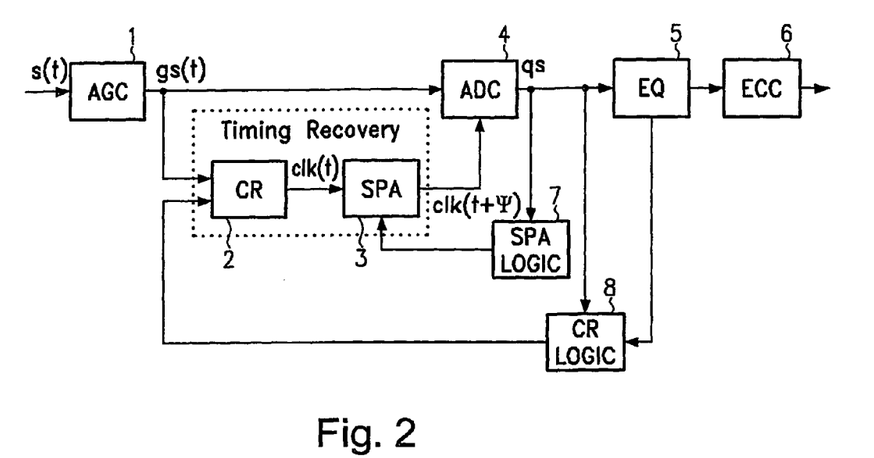
FIG. 2 shows some relevant units of a digital receiver which may be used for high speed optical data transmission.

A clock recovery (CR) circuit 2 extracts frequency and phase and generates a local sampling clock at equidistant points in time, with some fixed phase relation to the transmitted symbol stream. As explained above (cf. Buchwald95), CR circuit 2 may be connected to the output of the AGC 1 in order to recover the clock on the bases of the gain controlled signal gs(t). Alternatively or in addition the CR circuit 2 may be connected via CR logic circuit 8 to the output of ADC 4 in order to recover the clock on the basis of the quantized samples (cf. U.S. Pat. No. 5,048,060).

Figure 1:
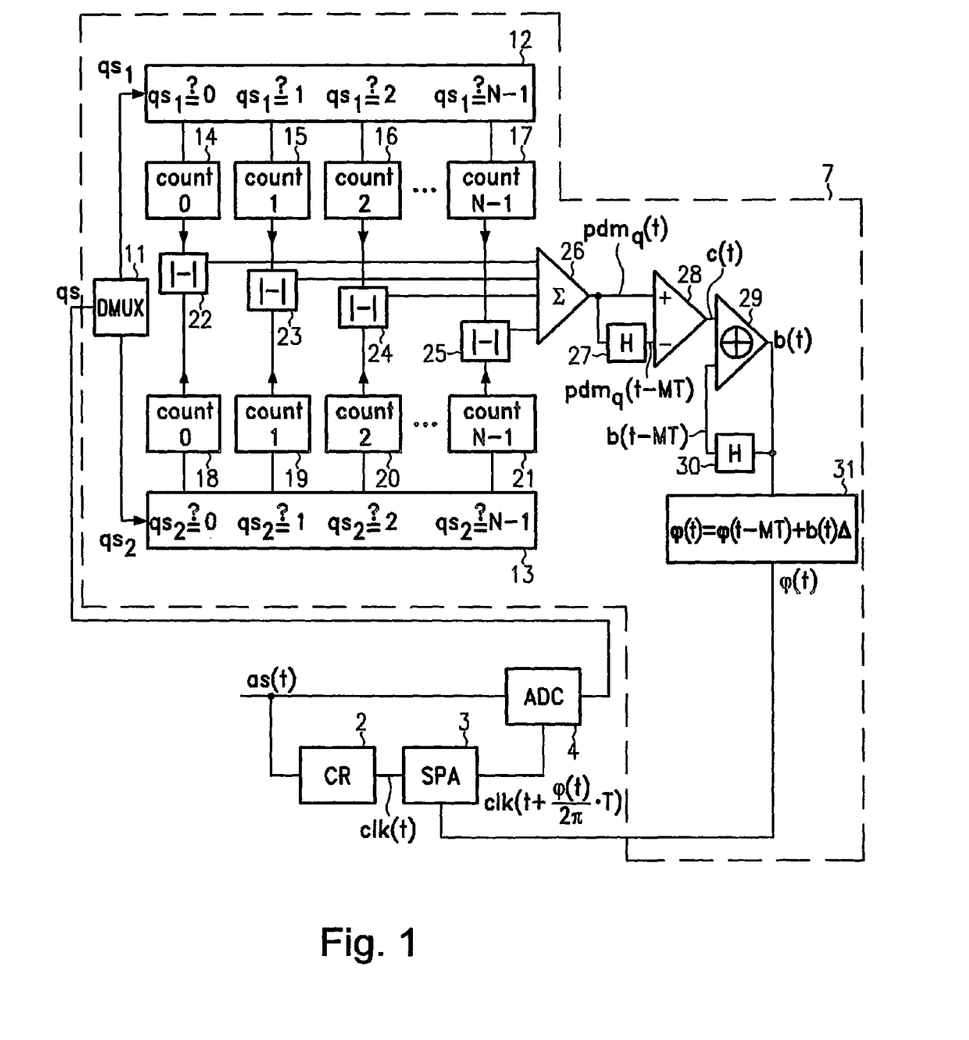
FIG. 1 shows one embodiment of an inventive sampling phase adjustment circuit.

A Sampling Phase Adjustment (SPA) circuit 3 adds a phase delay to the recovered sampling clock, in order to optimize receiver performance. The phase delay is determined by SPA logic circuit 7 based on the quantized samples qs. Two embodiments of SPA logic circuit 7 are shown in FIG. 1.

In order to reduce the bit error rate (BER) at the output of equalizer 5, which is implemented as Viterbi equalizer in one embodiment, the signal is oversampled at twice the symbol rate.

Samples representing the transmitted symbols are processed to get the correct sampling phase. The two samples representing a transmitted symbol are sampled at phase $\phi_k$, k={1,2}, $0 \leq \phi_k \leq 2\pi$. To find the best sampling phase a population difference parameter pd defined by equation (1) may be utilized:

$$pd = \int_{-\infty}^{\infty} |pdf_{\varphi_1}(x) - pdf_{\varphi_2}(x)| dx \quad (1)$$

pdf denotes the amplitude probability density function at either oversampling phase. pd is called a population difference parameter, because it describes the overall difference in population (density) per possible amplitude level.

There is no practical way for calculating the values of these probability density functions in real systems. Consequently, these distributions are approximated by their discrete counterparts, i.e. by amplitude histograms obtained from processing quantized samples.

The ADC 4 has N quantization levels. In an embodiment N is a power of 2: $N=2^n$. In this embodiment n bits are used to represent a sample value. The N different amplitudes are mapped into digital words denoted by $a_i$, i={1,2, ..., N}, and $a_i$=i−1. For a predetermined duration the timing recovery circuit counts the occurrences of each possible word at the two different sampling instants $\phi_k$, k={1,2} by using 2N counters. By applying this counting, two histograms approximating the probability density functions are obtained. The counter states after M symbols are denoted $c_{\phi_k}(i)$. A quantized population difference parameter $pd_q$ is defined in equation (2):

$$pd_q = \sum_{i=0}^{N-1} \left| \frac{c_{\varphi_1}(i)}{M} - \frac{c_{\varphi_2}(i)}{M} \right| \quad (2)$$

$$\sum_{i=0}^{N-1} c_{\varphi_k}(i) = M \text{ for } k = \{1, 2\} \quad (3)$$

The sum of all counter states $c_{\phi_k}(i)$ after M symbols is M as indicated by equation (3). For reasons of practical implementation, we introduce a quantized modified population difference parameter $pdm_q$:

$$pdm_q = \sum_{i=0}^{N-1} |c_{\varphi_1}(i) - c_{\varphi_2}(i)| = M \cdot pd_q \quad (4)$$

Implementation

An embodiment of the SPA logic circuit 7 for calculating $pdm_q$ and timing adjustment is shown in FIG. 1. It comprises a de-multiplexer 11, distribution circuits 12 and 13, counters 14, 15, 16, 17, 18, 19, 20 and 21, absolute difference circuits 22, 23, 24 and 25, adder 26, a holding circuit 27, a comparator 28, an exclusive-OR (XOR) circuit 29 and a phase calculation circuit 31. The quantized samples qs are first demultiplexed by demultiplexer 11. The quantized samples qs$_1$ which have been sampled at phase $\phi_1$ are provided to distribution circuit 12 by demultiplexer 11. On the other hand quantized samples qs$_2$ sampled at phase $\phi_2$ are provided to distribution circuit 13 by demultiplexer 11. The distribution circuits compare each quantized sample to a plurality of digital values the quantized samples may assume. To each of the digital values a counter is associated. The distribution circuit generates a clock pulse for every quantized sample it receives in order to increment the counter to which the digital value of the quantized sample is associated with. Thereafter the 2N counters 14 to 21 count all events during a predetermined time period MT, where T is the symbol period. The absolute difference circuits 22 to 25 and the adder 26 implement equation (4) i. e. calculate the pdm$_q$(t) parameter value at time t.

In another embodiment the ADC 4 may already have two outputs, a first output for the quantized samples $qs_1$ which have been sampled at phase $\phi_1$ and a second output for the quantized samples $qs_2$ which have been sampled at phase $\phi_2$. This embodiment does not comprise demultiplexer 11. Rather the first and second outputs are directly connected to the inputs of distribution circuits 12 and 13, respectively.

A further embodiment comprises a 1:m-type demultiplexer 11, m distribution circuits, m counter groups, each comprising N counters and N/2 absolute difference circuits. Consequently the circuitry between demultiplexer 11 and adder 26 is m-fold parallel. Provided that 2-fold oversampling is employed in this embodiment, the m-fold parallelism decreases the necessary processing speed of the distribution circuits, counters and absolute value circuits by a factor of m/2 compared to the embodiment shown in FIG. 1.

Holding circuit 27 stores the previously calculated $pdm_q(t-MT)$ parameter value which has been calculated at time t−MT. Comparator 28 compares the newly calculated $pdm_q(t)$ parameter value with the previously calculated $pdm_q(t-MT)$ parameter value in order to output control signal $c(t) \in \{-1,1\}$. Control signal c(t) is input into XOR circuit 29. XOR circuit 29 generates a timing signal $b(t) \in \{-1,+1\}$ to be used for sampling phase adjustment. Timing signal b(t) is feed back to the other input of XOR circuit 29 via holding circuit 30 in order to delay timing signal b(t) by MT. Consequently the XOR circuit 29 XORs c(t) and b(t−MT). Table 1 depicts its functionality.

TABLE 1 functionality of XOR circuit 29

| c(t) | b(t-MT) | b(t) |
|---|---|---|
| −1 | −1 | 1 |
| −1 | 1 | −1 |
| 1 | −1 | −1 |
| 1 | 1 | 1 |

Practically, the sampling phase adjustment circuit 3 works in a dithering mode and during an adjustment time this circuit will tend to find the desired sampling phase, that is, the sampling phase maximizing the population difference parameter $pdm_q$.

The new value of a sampling phase $\phi(t)$ is obtained by using equation (5):

$$\phi(t) = \phi(t-MT) + b(t)\Delta \quad (5)$$

In equation (5) $\phi(t-MT)$ represents the previous or old sampling phase and $\Delta$ represents a sampling phase adjustment step. Equation (5) is implemented in phase calculation circuit 31. Sampling phase p(t) is provided to SPA circuit 3 which updates the phase shift $\phi(t)$ in compliance with equation (5) after a time of MT and shifts the clock clk(t) provided by clock recovery circuit 2 by $(\phi(t)/2\pi)T$ in order to generate a shifted clock $clk(t+(\phi(t)/2\pi)T)$. After a few phase adjustments, the sampling phase providing the maximum value of the $pdm_q$ parameter will be reached, and subsequently be tracked.

In an alternate embodiment XOR circuit 29 may be a conventional logic circuit inputting either logic 1s or 0s and outputting 0s or 1s. In this embodiment equation 5 must be modified in that previous sampling phase $\phi(t-MT)$ is increased by $\Delta$ if b(t) is one and old sampling phase is decreased by $\Delta$ if b(t) is equivalent to 0 in phase calculation circuit 31.

Simulation

Figure 3:
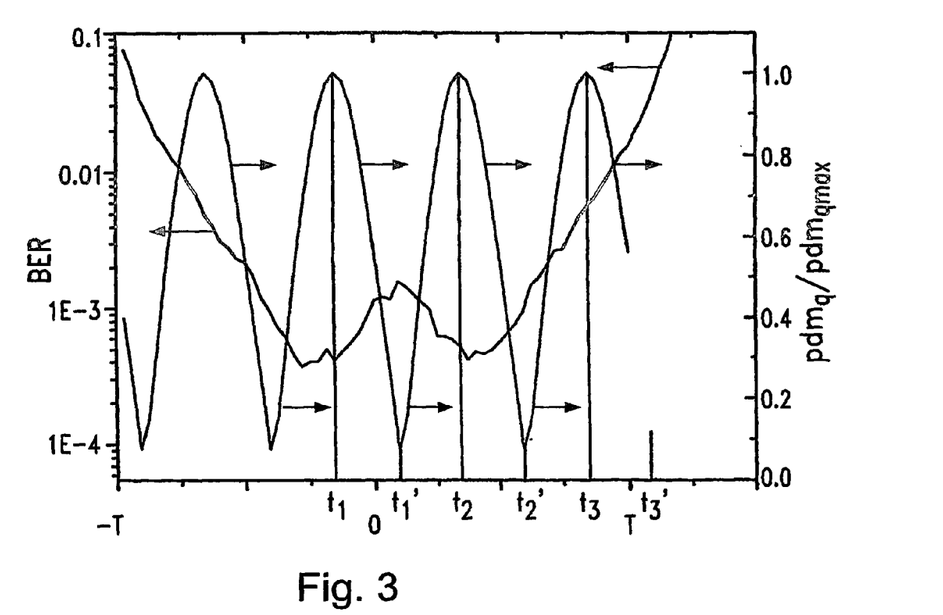
FIG. 3 shows the dependence of the bit error rate and a population difference parameter on the sampling phase.
Figure 4:
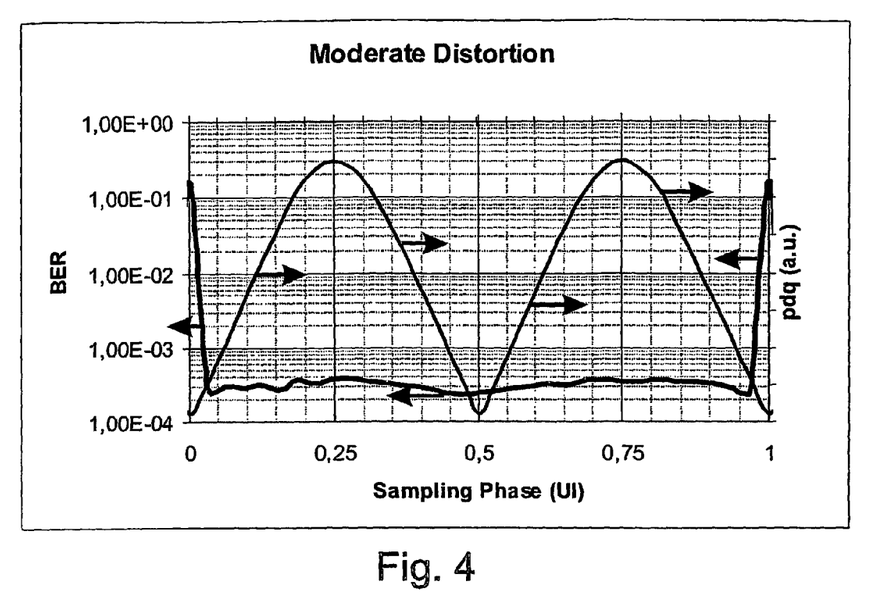
FIG. 4 shows the population difference parameter vs. bit error rate for an optical channels with a moderate level of distortion.
Figure 5:
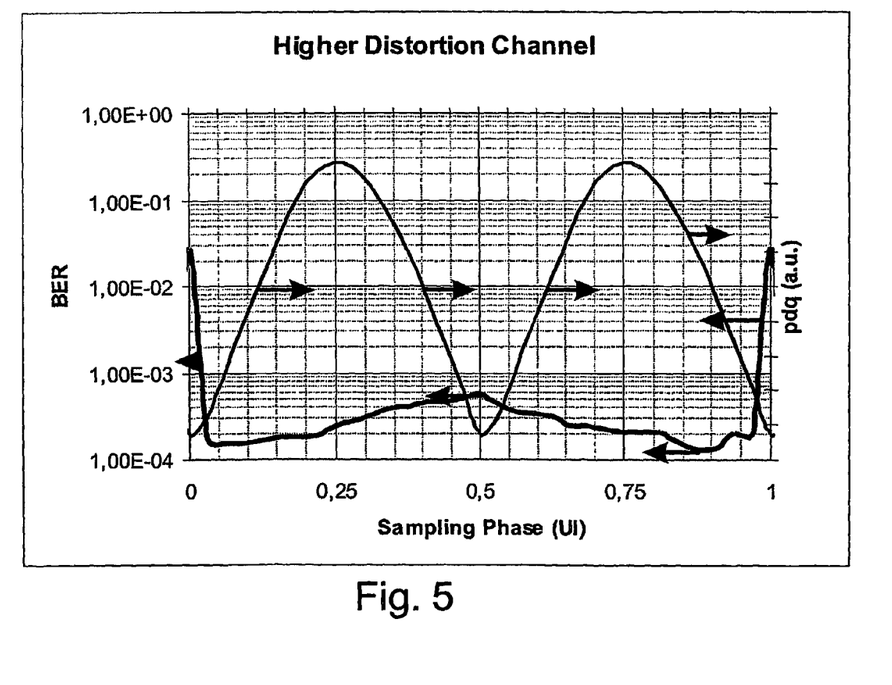
FIG. 5 shows the population difference parameter vs. bit error rate for an optical channels with a medium level of distortion.
Figure 6:
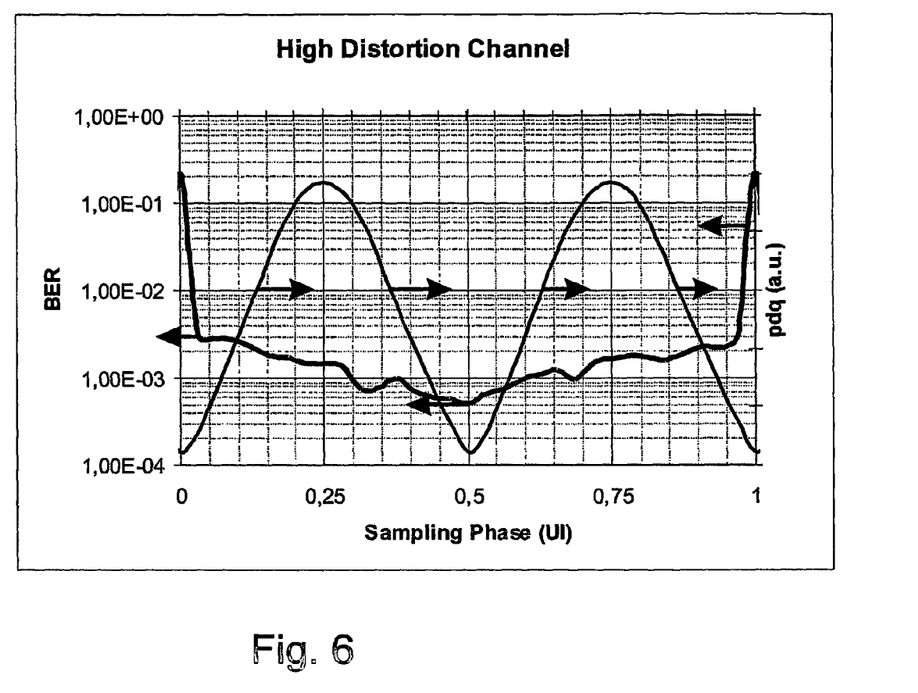
FIG. 6 shows the population difference parameter vs. bit error rate for an optical channels with a high level of distortion.

To show the power of the inventive method an optical channel with a high amount of chromatic dispersion, polarization mode dispersion, and noise was simulated. The sampling resolution was T/32 equivalent to 32-fold oversampling for simulation purposes in order to arrive at a quasi-continuous signal. After ADC 4, a fractionally spaced ML equalizer using two samples in a bit slot for a branch metric calculation was applied. The BER obtained at the output of the fractionally spaced ML equalizer is shown in FIG. 3, where the bit error rate shown at time instant t is obtained by using samples at point t and t+T/2. In FIG. 3 the $pdm_q$ parameter is represented, normalized by its maximum value. It can be seen that sampling at time instants $(t_1, t_2)$ produces a nearly optimum BER performance of $4 \cdot 10^{-4}$. In fact, the true minimum is 4/32T earlier; however, for practical purposes, this deviation from true minimum is not significant. In this connection reference is made to FIG. 2, specifically ECC 6 which can operate at BERs of $10^{-3}$ and reduces these BERs to $10^{-9}$ to $10^{-15}$ at its output. Nearly optimum BER is also obtained for the case of sampling at time instants $(t_2, t_3)$. Sampling at time instants $(t_1', t_2')$ leads to satisfactory BER, which, however, is still significantly worse than the BER produced when sampling at time instants $(t_1, t_2)$.

In one bit slot there are two local minima and two local maxima of the $pdm_q$ parameter. By selecting either of these maxima the equalizer 5 and ECC 6 will have almost minimum BER at its respective output.

Auxiliary simulation results indicate that about 2000 symbols are enough to get a sufficiently accurate value of the $pdm_q$ parameter for use in sampling phase adjustment.

In essence, the population difference parameter provides a gross measure of the similarity of the amplitude statistics in two sampling instants. For many channels It can be observed that an oversampling receiver such as a fractionally spaced Viterbi detector performs very well with maximally different amplitude statistics at the two sampler outputs, corresponding to maximization of the population difference parameter. This is described above.

However, for other channels, e.g. with largely symmetrical impulse response, it can be observed that BER is close to optimum when the main lobe of the impulse response is sampled symmetrically. This corresponds to a situation where the two amplitude statistics are maximally similar, i.e. where population difference parameter has a minimum.

Minimizing instead of maximizing the population difference parameter can have additional advantages:

The minimum of the population difference parameter is easier to find by dithering, and it can be maintained with lower phase jitter, since the minimum is usually cusp-like, even for very distorted channels; in contrast, the maximum of the population difference parameter tends to flatten out for severe distortion and Increasing noise, which might lead to larger phase excursions of the extremum-seeking phase control algorithm.

The minimum of the population difference parameter, when associated with the center of gravity of the two sampling phases, tends to be In the middle of the main lobe of the impulse response. This center of gravity sampling phase in the middle of the symbol interval Is less sensitive to jitter in the input signal than the sampling phase corresponding to any maximum of the population difference parameter, which is T/4 closer towards the boundaries of the symbol interval.

One fact must however be taken Into account: there are two sampling phases with minimum population difference parameter per symbol interval. One of these sampling phases leads to minimum BER, whereas the other one leads to high BER. In the latter case the two sampling instants are not symmetrical around the middle of the symbol interval, but rather symmetrical around the edge of the symbol interval. In other words, the two samples have same amplitude statistics but are basically uncorrelated. Using the minimum of the population difference parameter may require additional circuitry to resolve this ambiguity.

In summary, either minimizing or maximizing the population difference parameter can find sampling instants that correspond to close-to-minimum performance for a large class of channels.

FIG. 3 to 6 show the behavior of the population difference parameter vs. bit error rate for three optical channels with increasing level of distortion. For highest distortion and for highest jitter tolerance, minimizing the population difference parameter leads to the best BER, compromising a little bit on intermediate levels of distortion. On the other hand, maximizing the population difference parameter has the advantage that there is no ambiguity because either maximum provides good BER.

Further modifications and variations of the present invention will be apparent to those skilled in the art in view of this description. Accordingly, this description is to be construed as illustrative only and is for the purpose of teaching those skilled in the art the general manner of carrying out the present invention. It is to be understood that the forms of the invention shown and described herein are to be taken as the presently preferred embodiments.

The invention claimed is:

1. A self-timing method for phase adjustment of a sampling phase of an analog signal comprising a stream of symbols transmitted without a carrier, the method comprising:
   digitizing the analog signal at a first sampling phase within a symbol in order to generate a first quantized sample having a first digital value out of a first plurality of digital values;
   digitizing the analog signal at a second sampling phase different from said first sampling phase within said symbol in order to generate a second quantized sample having a second digital value out of a second plurality of digital values;
   repeating the digitizing at said first and second phases for different symbols in said analog signal;
   associating each of a first plurality of counters with a different one of said first plurality of digital values;
   associating each of a second plurality of counters with different one of said second plurality of digital values;
   during a predetermined period of time, incrementing a corresponding one of the first plurality of counters based on first digital values of the first quantized samples and incrementing a corresponding one of the second plurality of counters based on the second digital values of the second quantized samples;
   computing differences between count values of corresponding ones of the first plurality of counters and the second plurality of counters;
   adjusting said first and second sampling phases based on the differences computed between corresponding ones of the first counters and second counters.

2. The method of claim 1, wherein computing differences comprises computing an absolute value of the differences between corresponding ones of the first plurality of counters and the second plurality of counters, and further comprising computing a population difference parameter from a sum of the absolute value of differences, and wherein adjusting comprises adjusting said first and second sampling phases based on said population difference parameter.

3. The method of claim 2, wherein adjusting comprises adjusting the first and second sampling phases so as to maximize said population difference parameter f.

4. The method of claim 2, further comprising performing the digitizing, increasing and computing during each of a plurality of successive predetermined periods of time in order to generate the population difference parameter for each predetermined period of time, comparing the population difference parameter for a current predetermined period of time with the population difference parameter for a previous predetermined period of time to generate a control signal used for adjusting the first and second sampling phases.

5. The method of claim 1, wherein said first and second plurality of digital values comprise N different values and said first and second pluralities of counters comprise N counters.

6. The method of claim 2 further comprising:
   repeatedly calculating said population difference parameter for each of a plurality of successive time periods in order to generate the population difference parameter for each predetermined period of time;
   comparing a first population difference parameter for a first predetermined period of time to a second population difference parameter for a second predetermined period of time subsequent said first predetermined period of time;
   increasing said first and second sampling phases when said second population difference parameter is greater than said first population difference parameter and said first and second sampling phases have been increased after the calculation of said first population difference parameter or when said second population difference parameter is less than said first population difference parameter and said first and second sampling phases have been decreased after the calculation of said first population difference parameter; and
   decreasing said first and second sampling phases when said second population difference parameter is less than said first population difference parameter and said first and second sampling phases have been increased after the calculation of said first population difference parameter or when said second population difference parameter is greater than said first population difference parameter and said sampling phases have been decreased after the calculation of said first population difference parameter.

7. An apparatus comprising:
   an analog-to-digital converter configured to receive an analog signal comprising a stream of symbols transmitted without a carrier, said analog-to-digital converter configured to perform at least two analog-to-digital conversions per symbol period to produce first quantized samples at a first sampling phase and second quantized samples at a second sampling phase different from said first sampling phase such that each first quantized sample takes on a digital value of a first plurality of digital values and each second quantized sample takes on a digital value of a second plurality of digital values;
   a first plurality of counters each of which being associated with a corresponding one of said first plurality of digital values and each of the first plurality of counters being configured to be incremented when a value of a first quantized sample is equal to its associated one of the first plurality of digital values to;
   a second plurality of counters each of which being associated with a corresponding one of said second plurality of digital values and each of the second plurality of counters being configured to be incremented when a value of a second quantized sample is equal to its associated one of the second plurality of digital values to; and a sampling phase adjustment circuit configured to control the first and second sampling phases of said analog-to-digital converter based on differences between count values of corresponding ones of the first plurality of counters and the second plurality of counters.

8. The apparatus of claim 7, and further comprising:

a plurality of difference computation circuits configured to be coupled to corresponding ones of the first plurality of counters and corresponding ones of the second plurality of counters, and configured to compute an absolute value of a difference between count values of corresponding ones of the first plurality of counters and the second plurality of counters;

an adder configured to add outputs of the plurality of difference computation circuits to produce an output representing a population difference parameter; and wherein the sampling phase adjustment circuit is configured to adjust the sampling phases of the analog-to-digital converter based on the output of the adder circuit.

9. The apparatus of claim 8, wherein the sampling phase adjustment circuit is configured to adjust the sampling phases of the analog-to-digital converter so as to maximize the population difference parameter.

10. The apparatus of claim 8, wherein the adder is configured to add outputs of the plurality of difference computation circuits over each of a plurality of successive predetermined periods of time in order to generate the population difference parameter for each predetermined period of time:

a comparator circuit configured to receive the output of the adder and to compare a population difference parameter for a current predetermined period of time with a population difference parameter for a previous predetermined period of time;

a phase calculation circuit connected to the output of said comparator circuit and to said sampling phase adjustment circuit and configured to output a phase shift to said sampling phase adjustment circuit, said phase calculation circuit configured to:

increase said sampling phases when said population difference parameter for the current predetermined period of time is greater than said population difference parameter for the previous predetermined period of time and said first and second sampling phases have been increased after the calculation of said population difference parameter for the previous predetermined period of time or when said population difference parameter for the current predetermined period of time is less than said population difference parameter for the previous predetermined period of time and said first and second sampling phases have been decreased after the calculation of said population difference parameter for the previous predetermined period of time; and decrease said sampling phases when said population difference parameter for the current predetermined period of time is less than said population difference parameter for the previous predetermined period of time and said first and second sampling phases have been increased after the calculation of said population difference parameter for the previous predetermined period of time or when said population difference parameter for the current predetermined period of time is greater than said population difference parameter for the current predetermined period of time and said first and second sampling phases have been decreased after the calculation of said population difference parameter for the previous predetermined period of time.

11. The apparatus of claim 7, further comprising:

a de-multiplexer connected to said analog-to-digital converter and configured to output said first quantized samples at a first output and said second quantized samples at a second output;

a first distribution circuit connected to said first output of said de-multiplexer and each of said first plurality of counters, said first distribution circuit configured to compare each a first quantized sample to the first plurality of digital values to which a corresponding counter of said first plurality of counters is associated and to generate a clock pulse to increment the corresponding counter of the first plurality of counters to which the digital value is associated that is equal to said first quantized sample; and a second distribution circuit connected to said second output of said de-multiplexer and each of said first plurality of counters, said second distribution circuit configured to compare each second quantized sample to the second plurality of digital values to which a corresponding counter of said second plurality of counters is associated and to generate a clock pulse to increment the corresponding counter of the second plurality of counters to which the digital value is associated that is equal to said second quantized sample.

12. The method of claim 1, and further comprising receiving the analog signal with a receiver of a communication device.

13. The method of claim 12, wherein receiving comprises outputting the analog signal from an antenna in the communication device that receives a digitally transmitted signal.

14. The method of 12, wherein receiving comprises outputting the analog signal from an optical-to-electrical interface of an optical receiver in the communication device that receives a digitally transmitted signal.

15. The method of claim 4, wherein the predetermined period of time is a symbol period.

16. The method of claim 15, and further comprising performing an exclusive-OR operation on the control signal and a timing signal that is delayed by the predetermined period of time to output the timing signal for a current symbol period, and computing a sampling phase for the current symbol period based on the sampling phase for a previous symbol period, the timing signal and a sampling phase adjustment step value.

17. The apparatus of claim 8, wherein the adder is configured to add outputs of the plurality of difference computation circuits over each of a plurality of successive predetermined periods of time in order to generate the population difference parameter for each predetermined period of time, and further comprising a comparator configured to compare the population difference parameter for a current predetermined period of time with the population difference parameter for a previous predetermined period of time to generate a control signal used for adjusting the first and second sampling phases.

18. An apparatus comprising:

means for receiving an analog signal comprising a stream of symbols transmitted without a carrier and for converting the analog signal to produce first quantized samples at a first sampling phase and second quantized samples at a second sampling phase different from the first sampling phase such that each of the first quantized samples takes on one of a first plurality of digital values and each of the second quantized samples takes on one of second plurality of digital values;

first means for incrementing a corresponding one of a first plurality of count values based on the first quantized samples, each first count value corresponding to one of the first plurality of digital values of the first quantized samples;

second means for incrementing a corresponding one of a second plurality of count values based on the second quantized samples, each second count value corresponding to one of the second plurality of digital values of the second quantized samples;

means for computing differences between corresponding ones of the first plurality of count values and second plurality of count values during a predetermined period of time; and means for adjusting the first and second sampling phases based on the differences computed between corresponding ones of the first plurality of count values and second plurality of count values.

19. The apparatus of claim 18, wherein means for computing differences is configured to compute an absolute value of the differences between corresponding ones of the first plurality of counter values and the second plurality of count values and further comprising means for computing a population difference parameter from a sum of the absolute value of differences, and wherein the means for adjusting is configured to adjust said first and second sampling phases based on said population difference parameter.

20. The apparatus of claim 19, wherein the first means for incrementing and the second means for incrementing are configured to increment respect ones of the first plurality of count values and respective ones of the second plurality of count values during each of a plurality of successive predetermined periods of time, and the means for computing the population difference parameter is configured to compute the population difference parameter for each predetermined period of time, and further comprising means for comparing the population difference parameter for a current predetermined period of time with the population difference parameter for a previous predetermined period of time to generate a control signal used for adjusting the first and second sampling phases.

* * * * *

UNITED STATES PATENT AND TRADEMARK OFFICE
CERTIFICATE OF CORRECTION

PATENT NO. : 8,068,572 B2  
APPLICATION NO. : 10/547169  
DATED : November 29, 2011  
INVENTOR(S) : Stefan Langenbach Page 1 of 1

It is certified that error appears in the above-identified patent and that said Letters Patent is hereby corrected as shown below:

On the front page of the patent in section (75) Inventors, replace "Negojsa Stojanovic" with -- Nebojsa Stojanovic --.

Signed and Sealed this

Seventh Day of February, 2012

David J. Kappos
*Director of the United States Patent and Trademark Office*